April 19, 1960
T. F. WHITE
2,933,116
SANITARY SAW LINER
Filed Oct. 28, 1958
2 Sheets-Sheet 1
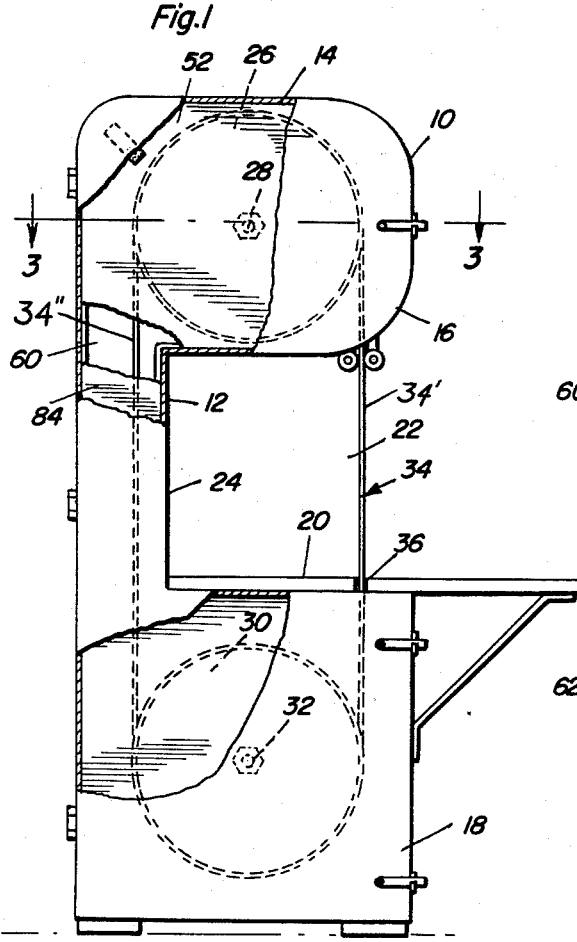
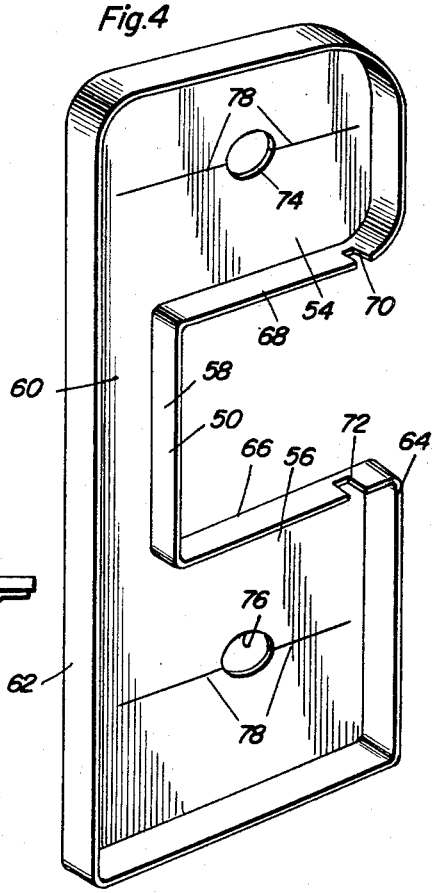
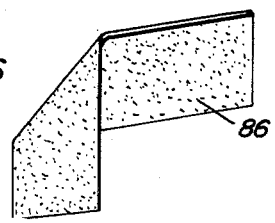
Thomas F. White
INVENTOR.

April 19, 1960     T. F. WHITE     2,933,116
SANITARY SAW LINER
Filed Oct. 28, 1958     2 Sheets-Sheet 2
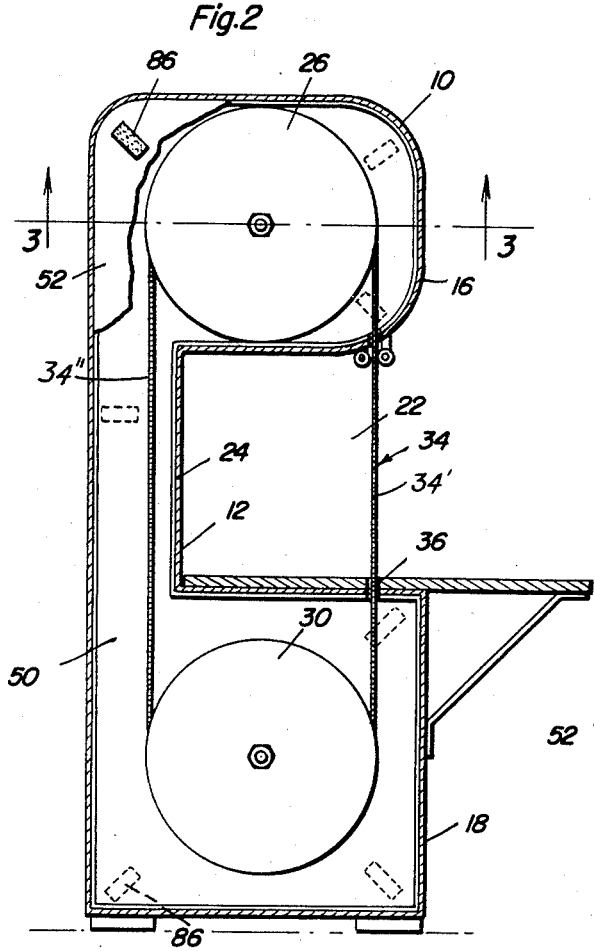
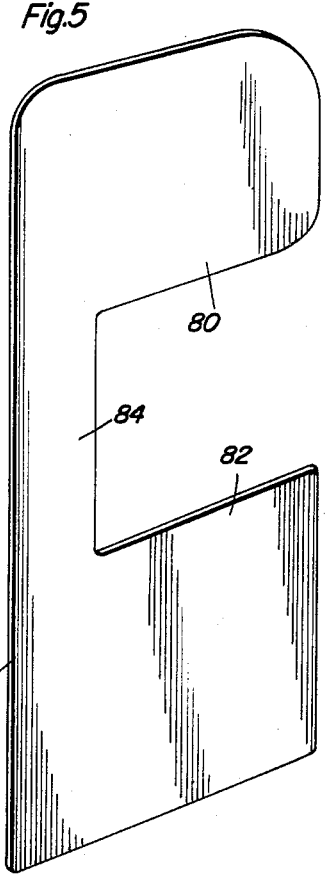
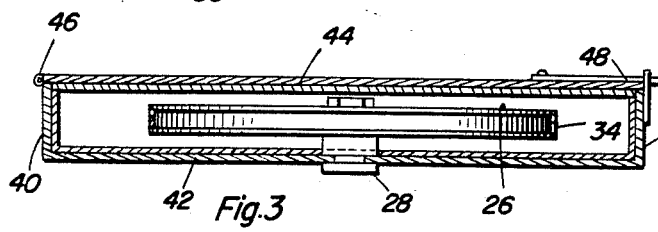
Thomas F. White
INVENTOR.

United States Patent Office 2,933,116
Patented Apr. 19, 1960

2,933,116
SANITARY SAW LINER
Thomas F. White, Kalispell, Mont.

Application October 28, 1958, Serial No. 770,068

14 Claims. (Cl. 146—88)

This invention relates to a sanitary attachment for a saw and more particularly to a liner for the housing of a saw to greatly minimize, if not completely obviate contamination of the interior of the saw housing.

The principles of the invention are applicable with saws, particularly band-saws which are used for a variety of purposes. One of the principal applications of the invention, though, is in connection with band-saws used to cut foods of one type or another. Included in this group is the meat saw used in butcher shops and packing plants or other meat processing establishments. Therefore the ensuing description is in connection with meat saws, although it is to be clearly understood that the invention is not limited to such an application.

Large meat saws used in butcher shops, packing plants and other food processing establishments are band saws operated around a pair of pulleys, one of which is located in the upper part of the saw frame and the other of which is located in the bottom part of the saw frame. The pulleys and a major part of the endless blade move in a closed housing, one side of which is provided with a door which is periodically opened for insertion and removal of blades and for cleaning the interior of the housing and all other parts therein.

Saws of this type become contaminated with particles of meat, bone, sinews, etc. that are deposited on the inside surface of the housing and which require constant laborious cleaning and disinfecting to prevent the contamination from turning to spoilage. In fact, even in retail markets, the saw must be completely cleaned daily in order to meet with minimum sanitation requirements in many areas of the country.

Accordingly, an object of this invention is to prevent the deposit and subsequent accumulation of particles within the housing of such a saw and thereby practically, if not completely, obviate the inside of the saw housing and parts located therein from becoming contaminated. This has the consequence of very materially and drastically reducing the time and effort involved in keeping the saw in a sanitary condition.

A more specific object of the invention is to provide a liner for the housing of a band-saw, the liner preferably being of a disposable nature, but not necessarily so, and fitting within the housing to provide means on which the small particles may accumulate. Thereafter, when the housing is open for cleaning, the liner may be removed, exposing a clean housing interior which would require minimal additional cleaning and disinfecting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a typical meat saw, parts broken away to illustrate otherwise hidden detail.

Figure 2 is a sectional view of the meat saw and liner in Figure 1.

Figure 3 is a cross sectional view taken approximately on the line 3—3 of Figure 1.

Figure 4 is a perspective view of a typical liner section constructed in accordance with the invention.

Figure 5 is a perspective view of the other section of the liner.

Figure 6 is an adhesive strip illustrating one manner of attaching the liner in place within the housing of the saw.

In the accompanying drawings there is a conventional saw 10 of the type commonly used in food, especially meat cutting. The saw has a number of structural components and features which are not shown inasmuch as they do not enter directly into an understanding of the invention. The illustration has a saw frame 12 made of a separable housing 14 with an upper part 16 and a lower part 18. The saw table 20 is in the opening 22 between upper part 16 and lower part 18 of the housing. The housing is substantially C-shaped having upper part 16 and lower part 18 connected together by a reduced diameter intermediate part 24.

Upper pulley 26 is mounted for rotation on a spindle 28, and lower pulley 30 is mounted for rotation on a spindle 32. The spindles pass through openings in one wall of the housing, and one of them is power operated by a motor (not shown). Saw blade 34 is entrained about both pulleys with one leg of the saw blade 34″ passing through the intermediate part 24 of the housing and the intermediate portion of the other leg of the blade 34′ exposed at the front of the housing and passing through slot 36 in table 20.

Housing 14 has narrow front and rear walls 38 and 40 respectively together with wide side walls 42 and 44. The side wall 44 is mounted on hinges 46 and has latches 48 holding the door in a closed position. The door is periodically opened, exposing the upper and lower pulleys and saw blade so that adjustments may be made, for instance the blade may be removed and replaced. Further, door 44 is opened in order to make the necessary periodic cleaning of the interior of the housing.

The invention provides a liner made of two sections 50 and 52 to cover the entire inside surface of housing 14. Section 50 has the general outline of the housing namely; an upper part 54, a lower part 56 and an intermediate part 58 arranged in generally C-shaped formation. The flat rear wall 60 of the liner is adapted to fit flush against the wall 42 of housing 14. Comparatively narrow rear wall 62 fits flush against the wall 40, and the irregularly shaped narrow front wall 64 fits against the similarly shaped wall 38 of the saw housing. Horizontal parts 66 and 68 of wall 64 fit against the bottom surface of table 20 and top surface of the lower wall of part 16 of housing 14. Therefore, they have aligned slots 70 and 72 through which the saw blade 34 passes in normal operation of the saw.

Wall 60 has an opening 74 in upper part 54, and an opening 76 in lower part 56. The openings receive spindles 28 and 32 behind pulleys 26 and 30. The liner section 50 may be applied into the housing by removing the upper and lower pulleys, locating section 60 in the housing and then replacing the pulleys. As an alternative, pulleys 26 may remain in place, and the openings 74 and 76 formed with slits 78 on opposite sides thereof. The slits may be opened thereby greatly enlarging openings 74 and 76. Then the liner section 50 may be fitted over the pulleys and returned to its correct shape (Figure 4) when in the housing. These are only two of a number of possible variations for enabling section 50 to be easily installed and removed.

Section 52 is actually a flat panel of generally C-shaped form. Therefore, it has an upper part 80, a lower part 82 and an intermediate part 84 shaped in plan the same as wall 60. When the liner is made of a substance capable of sustaining itself in an erect position, for instance some of the commercially available plastics, or a deformable substance such as heavy kraft paper, certain grades of wax paper or even plaster, little or nothing is required to hold the liner in place in the saw housing. To be certain, though, that it will remain in its proper position, particularly when the liner is made of deformable material such as kraft paper or wax paper, small strips 86 having pressure sensitive adhesive on both surfaces thereof may be applied to any, some or all of the walls of either or both sections 50 and 52 so as to adhere the sections to the interior of the housing 12.

It is now apparent that when cleaning is required, the job is very materially facilitated by removing the liner and discarding it. A non-disposable liner is also contemplated by this invention, in which case the liner would be removed, cleaned and replaced. Regardless of whether the liner is disposable or nondisposable, it may be made of one or more pieces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A butcher-type band saw including a pair of aligned pulleys and an endless saw therearound, a separable housing enclosing both of said pulleys and one leg of said saw, the intermediate portion of the other leg of said saw being exposed, said housing having a removable and disposable liner covering the entire inner surface of said housing whereby the interior of said housing may be cleaned by simply removing said liner.

2. The combination of claim 1, said housing having side walls and a peripheral wall between said side walls, said liner having side walls and a peripheral wall between said side walls, each of said walls of said liner fitting flush against the corresponding walls of said housing.

3. The combination of claim 1, said liner comprising a first section having a side wall and a peripheral wall and a separable second section consisting of a substantially flat panel, the free edge of said peripheral wall fitting snugly against said flat panel.

4. The combination of claim 1, said liner being deformable.

5. The combination of claim 1, each of said pulleys being rotatably mounted upon a pulley spindle, said liner having a side wall with spaced openings therein, each of said pulley spindles being passed through one of said openings.

6. The combination of claim 1, and adhesive means separably connected to said liner engaging said inner surface of said housing to retain said liner removably fastened within said housing.

7. The combination of claim 1, said housing having a first side wall, a separable second side wall and a peripheral wall between said side walls of said housing, said liner comprising a first section having a side wall fitting flush against said first side wall of said housing and a peripheral wall fitting flush against said peripheral wall of said housing, said liner having a second section consisting of a substantially flat panel fitting flush against said second side wall of said housing.

8. The combination of claim 7, said liner being deformable.

9. The combination of claim 7, and adhesive means separably connected to said liner engaging said inner surface of said housing to retain said liner removably fastened within said housing.

10. The combination of claim 7, said pulleys each being rotatably mounted upon a pulley spindle, said side wall in said first section of said liner having spaced openings, each of said pulley spindles being passed through one of said openings.

11. The combination of claim 7, the free edge of said peripheral wall of said liner fitting snugly against said substantially flat panel.

12. The combination of claim 7, said liner being deformable and the free edge of said peripheral wall of said liner fitting snugly against said substantially flat panel.

13. The combination of claim 12, and adhesive means separably connected to said liner engaging said inner surface of said housing to retain said liner removably fastened within said housing.

14. The combination of claim 13, said pulleys each being rotatably mounted upon a pulley spindle, said side wall in said first section of said liner having spaced openings, each of said pulley spindles being passed through one of said openings.

References Cited in the file of this patent

UNITED STATES PATENTS

| | | |
|---|---|---|
| 2,725,082 | Duron | Nov. 29, 1955 |
| 2,788,926 | Morrison | Apr. 16, 1957 |